Sept. 15, 1936.  P. H. CRAIG  2,054,496
POWER CONTROL CIRCUITS
Filed Jan. 3, 1935
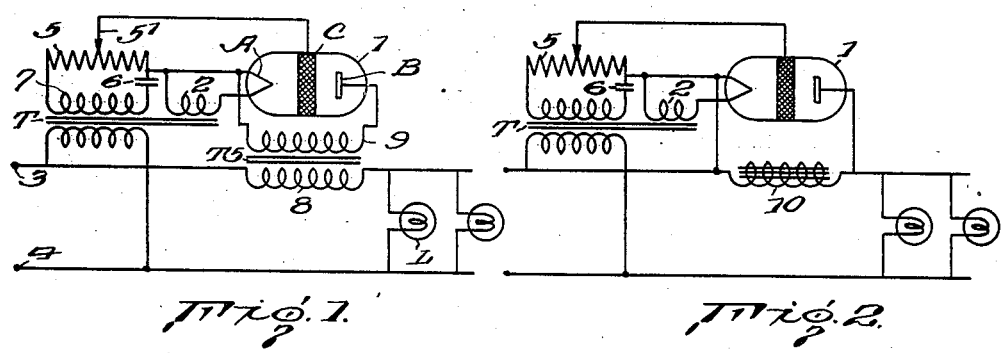
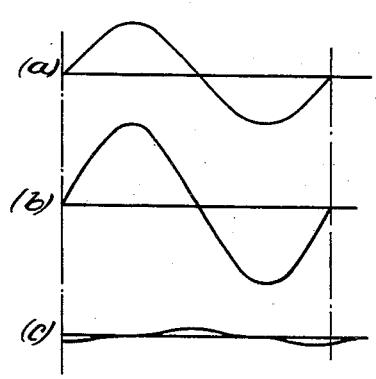
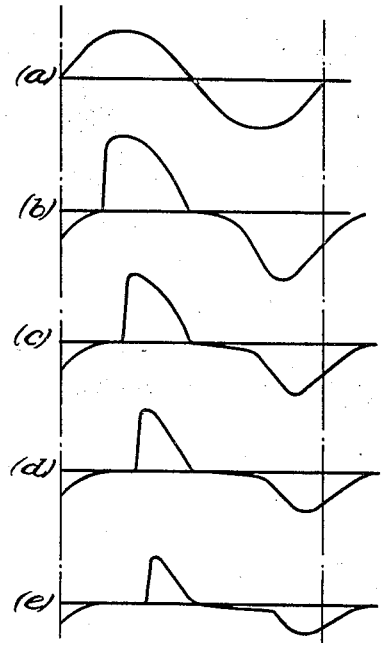
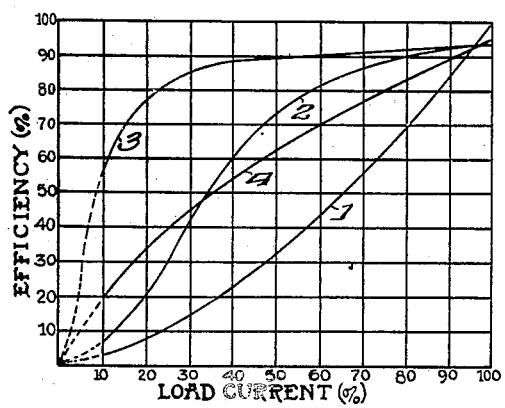
Inventor
Palmer Hunt Craig,
Ralph B. Stewart
Attorney Patented Sept. 15, 1936

2,054,496

UNITED STATES PATENT OFFICE 2,054,496

POWER CONTROL CIRCUITS

Palmer Hunt Craig, Bethlehem, Pa., assignor to Invex Corporation, a corporation of New York Application January 3, 1935, Serial No. 311

12 Claims. (Cl. 171—242)

My invention relates to arrangements for controlling the flow of power in electric circuits.

This application is in part, a continuation of my copending application Serial No. 646,662, filed December 10, 1932, now Patent No. 2,001,837. It also contains subject matter disclosed in my copending applications Serial Nos. 577,691, filed November 27, 1931 and 688,249, filed September 5, 1933, now Patents Nos. 2,001,836 and 2,001,838.

The broad object of my invention is to devise a voltage responsive relay of the vapor electric type for controlling the power in a circuit.

A further object is to devise a control circuit of the type described in which only one vapor electric relay having uni-directional conductivity may be employed for the control of power in an alternating current circuit without excessive distortion in the load current and with substantially the same efficiency as a control system employing two such relays connected to conduct current in both directions.

A further object of the present invention is to devise a control circuit of high efficiency for the control of substantial amounts of power by control apparatus having limited current carrying capacity. My invention is particularly useful as a dimmer circuit for theater lights and the like, although it may be used in other situations requiring a variation in the amount of power supplied to a load circuit.

My invention is illustrated in the accompanying drawing in which:

Figure 1 is a circuit diagram illustrating one modification of my control circuit;

Figure 2 is a circuit diagram illustrating a second modification of the control circuit;

Figures 3 and 4 are traces of oscillograms illustrating the operation of my invention; and Figure 5 illustrates efficiency curves for various forms of control systems.

The arrangement shown in Figure 1 comprises a vapor electric relay 1, such as a mercury vapor tube, having an electron emitting cathode A, an anode B and a control electrode C, which is preferably arranged on the outside of the tube envelope. The cathode A is heated from winding 2 of a transformer T connected across the terminals 3—4 of a source of alternating current. A resistance 5 and a condenser 6 are connected in series across the secondary winding 7 of transformer T, one end of the resistance 5 being connected to the cathode circuit, and variable tap 5' on resistance 5 is connected to the control electrode C. The power circuit to be controlled is connected to the terminals 3—4 and includes a suitable load L connected in series with the primary winding 8 of an impedance transformer T5. The secondary winding 9 of the impedance transformer is connected to supply space current to the relay 1. The values of resistance 5 and condenser 6 are so chosen that the potential applied to the control electrode C lags behind the voltage of the anode B by an angle of the order of 135°. This phase displacement is not absolute, but may be varied between 90° and 180° with varying results. Shifting the contact 5' along resistance 5 varies the amplitude of the control voltage applied to the electrode C and thereby varies the time of starting of the arc in each pulsation of the line voltage when the anode is positive with respect to the cathode. Increasing the amplitude of the control voltage delays the starting of the arc in each positive pulsation and thereby results in a decrease in effective space current, and a decrease in the amplitude of the control voltage advances the starting point of the arc to increase the effective value of the space current. It will be understood that once the arc is started it continues to flow until the end of the pulsation or until the anode voltage is less than the ionizing potential. The arrangement described above for controlling the flow of current through the vapor electric device is disclosed and claimed in my copending application Serial No. 577,691, filed November 27, 1931, now Patent No. 2,001,836.

The connection of tube 1 across the secondary winding of the impedance transformer forms a link circuit for effectively coupling the source and the load. For zero or low current values flowing through the tube, the primary of transformer T5 offers high impedance to current flowing through the load, and therefore, limits the load current. As the potential upon the grid of the control tube is adjusted to permit the current to flow through the tube for a longer period of time during each positive pulsation, the effective impedance of the primary of the transformer is reduced and the load current increased. Full load current flows when current is allowed to flow through the control tube for the entire duration of each positive pulse.

I have discovered that notwithstanding the unidirectional conductivity of the relay 1, the arrangement shown in Figure 1 gives excellent control of the alternating current flowing in the load circuit. Due to the low resistance of relay 1 during conduction periods, the transformer T5 is practically short-circuited during one alternation of the alternating current cycle and is open-circuited during the other alternation. From this condition it would be expected that the effective impedance of the transformer T5 at the terminals of primary winding 8 would be very low during the alternation when the tube 1 is conducting and very high during the alternation when the tube is non-conducting, and therefore unsymmetrical current would flow in the load circuit. I have discovered, however, that the current flowing in the load circuit is substantially symmetrical, that is, the current pulses on the positive and negative alternations are of substantially the same area, although the two pulses are of slightly different shapes. Furthermore, I find that the system shown in Figure 1 is of substantially the same effectiveness as a circuit in which two tubes are connected across the secondary 9 and arranged to conduct current in opposite directions. A complete explanation of the action of the single tube arrangement will not be given here, but traces of actual oscillograms taken on a circuit like that of Figure 1 are reproduced in Figures 3 and 4 to show the operation.

In Figure 3, curve (a) is a trace of the voltage impressed across terminals 3—4, and is shown here for reference purposes. Curve (b) is a trace of the load current when the secondary 9 is short-circuited, it being noted that the current is substantially of the same wave form as the impressed voltage, and is in phase with the voltage, the load being a lamp load. Curve (c) is a trace of an oscillogram showing the load current with the secondary winding 9 open-circuited. The time axes for the oscillogram traces run from left to right. The meter reading for the curve (b) indicated a load current of 12.7 amperes flowing when the secondary of the impedance transformer is short-circuited, and the meter reading corresponding to the condition represented by the curve (c) indicated a current of 0.92 amperes flowing in the load circuit when the secondary is open-circuited. It will be understood that in both (b) and (c), the tube is inactive. From these two curves it might reasonably be expected that the load current pulse on the positive alternation would be large and the current pulse on the negative alternation would be small when the relay 1 is effective. Also, it would be reasonable to expect that with the relay 1 conducting current for the entire positive alternation and non-conductive on the negative alternation, the effective value of the load current would be considerably less than the effective value of the current represented by curve (b), perhaps of the order of one-half the value of curve (b).

In Figure 4, I have shown traces of oscillograms representing the operation of Figure 1 when the tube 1 is effective. Curve (a) represents the impressed line voltage, and has been included for reference purposes, as in Figure 3. Curve (b) is a trace of an oscillogram showing the load current which flows when the tube 1 is conducting for substantially the entire period of each positive alternation. It is to be noted that the maximum amplitude of the current pulse in this case is of the same order of magnitude in curve (b), Fig. 3. The meter reading for this condition showed a load current of 10.9 amperes as compared with a current of 12.7 amperes represented by curve (b) in Figure 3. Also, the current pulse which flows on the negative alternation of the line voltage is of substantially the same area and amplitude as the current pulse flowing on the positive alternation. Curve (c) is a trace of an oscillogram showing the load current when tube 1 has been adjusted so that the load current is about three-fourths of the effective value represented by curve (b) immediately above. Curve (d) is a trace of an oscillogram showing the load current of about half the effective value of the current represented in curve (b), and curve (e) is a trace of an oscillogram showing the load current of about one-fourth of the effective value represented by curve (b). The meter readings given above were taken with moving iron vane instruments.

From a study of curves (b), (c), (d), and (e), in Figure 4, it will be seen that the symmetrical alternating current is maintained both at high and low current values, although the wave form of the positive current pulse is slightly steeper at the beginning than the negative current pulse. Also, by means of a single tube having unidirectional conductivity, it is possible to vary the load current from a maximum value (substantially equal to the current flowing when the secondary is short-circuited) down to a minimum value equal to the current flowing with the secondary open-circuited. A complete explanation of the operation of the circuit will not be given here, but I believe the action is due principally to the inductive character of the impedance transformer. It seems likely also that the unequal magnetic saturation of the transformer core, and the residual magnetism in the iron core, play a part in the action, although I find that the same general operation is obtained without a magnetic core.

The arrangement shown in Figure 2 is a modification of the circuit shown in Figure 1, and in this arrangement the transformer T5 is replaced by an iron cored choke coil 10, and the tube 1 is connected in shunt to the choke coil so that the space current of the tube is supplied from the potential drop across the choke coil. This circuit arrangement is otherwise like Figure 1 and also produces a substantially symmetrical alternating current in the load circuit, notwithstanding the uni-directional conductivity of the tube 1. An iron core is not essential to the operation, but it seems to give a better wave form and also enables the load current to be reduced to a lower minimum than the minimum obtained without a magnetic core.

While for the purpose of illustration, I have shown a specific arrangement for controlling the current flow in the relay 1, it will be understood that any other suitable arrangement may be employed, such as the well known phase-shift control system, examples of which have been described in an article by A. W. Hull in the General Electric Review for April and July, 1929. Also, while the tube 1 has been shown and described as provided with an external control electrode, an internal control electrode may be employed, if desired.

By the circuit of Figure 1 it is possible to vary the magnitude of a load current many times larger than the current capacity of the control tube. This circuit is particularly advantageous in that the losses incidental to the operation of the circuit are extremely low, thereby resulting in very high operating efficiency. The ratio of transformer T5 is suitably chosen so that the voltage is stepped up into the secondary to a value not to exceed the inverse voltage value permissible on the tube, and the current in the secondary winding must not exceed the current carrying capacity of the tube.

For the purpose of comparing the efficiency of the system of Figure 1 with other systems, I have reproduced in Figure 5 representative efficiency curves of various systems employed to control a 2 kva. lamp load. Curve 1 illustrates the efficiency of a simple resistance dimmer system in which a variable resistance is inserted in series with the lamp load. The drooping character of this curve is due to the high positive temperature coefficient of the load. Curve 2 is an efficiency curve for dimmer circuits of the type employing a saturatable core reactor connected in series with the lamp load. Curve 3 illustrates the efficiency of dimmer circuits of the type shown in Figure 1 of this application, and curve 4 illustrates the efficiency of a circuit like that shown in Figure 1 wherein a variable resistance is substituted for the control tube 1.

From an inspection of the curves shown in Figure 5 it will be seen that while the simple resistance dimmer system is one hundred per cent efficient at full load, this circuit is very inefficient at less than full load values, and is, therefore, not suited for dimmer purposes which involves the operation of a circuit for considerable periods at fractional load values. While the efficiency of the saturated reactor circuit as shown by curve 2 maintains a fairly high percentage in the neighborhood of full load values, the efficiency of this system drops off sharply below 60% load current. Curve 3 illustrates the efficiency of applicant's system, and the advantage of this system over the other systems is clearly shown by the materially increased efficiency at load values ranging from 60% full load current downward. The advantage of this system is apparent, since the region of increased efficiency falls within the operating range of the usual dimmer system.

Curve 4 has been inserted to show the advantage of applicant's system over a system in which a variable resistance replaces the vapor electric tube shown in Figure 1. The improved efficiency of applicant's system is due mainly to the fact that the vapor electric tube possesses low internal impedance. Within the working range of the tube, the voltage drop across the tube remains substantially constant at from 10 to 25 volts depending upon the particular construction of the tube. The advantage of inserting a step-up transformer between the load circuit and the tube, instead of inserting the tube directly in the load circuit, is that a tube of relatively small current carrying capacity may be employed, thereby resulting in less loss within the tube itself and in a material reduction in the losses incidental to the operation of the tube, such as the filament circuit losses, etc. This advantage will become apparent by comparison of the losses incidental to the operation of a tube capable of carrying directly a full load current of 15 amperes, and the losses in a tube required to handle the same load current through a step-up transformer of 10 to 1 ratio. The cathode heating losses in these tubes are roughly 125 watts and 25 watts, and the losses within the tubes themselves bear a ratio of 10 to 1. The improved efficiencies in applicant's system for small load current values is due in part also to the choking effect of the inherent reactance or leakage reactance of the step-up transformer upon the complex current which flows through the circuit at less than full load value. This complex current contains a large percentage of current components having frequencies higher than the fundamental or supply frequency, and the leakage reactance of the transformers exerts a greater choking effect upon these higher frequency components.

In both the arrangements shown and described above, it is clear that during the alternation when the tube is not conducting current, the full reactive effect of the impedance transformer (or of the choke coil) is present in the load circuit, while during the alternation when the tube is conducting current, the transformer (or the choke coil) is practically short-circuited. That is, the tube constitutes means for rendering the impedance element substantially ineffective during a variable period in only one alternation of the supply source. In the appended claims, the term "impedance coil" is to be interpreted to cover either the primary 8 of the impedance transformer or the choke coil 10 in Figure 2, or any equivalent element.

While for the purpose of describing my invention I have shown and described a mercury vapor tube or relay, it will be obvious that other ionizable gases may be employed in the tube instead of mercury vapor. Suitable gases for the purpose are known, such as argon and xenon, the latter having the advantage of being independent of ambient temperature.

The circuit arrangements of Figures 1 and 2 are useful in many different applications, and in my copending application Serial No. 688,249, filed September 5, 1933 (now Patent No. 2,001,838), I have shown them applied to systems for regulating the voltage on feeder circuits. Other applications will be obvious to those skilled in the art.

What I claim is:

1. In combination, a source of alternating current, a load circuit connected to said source, an impedance coil connected in series with said load circuit, means rendering said coil substantially ineffective for a portion of only one alternation in each cycle of said source while permitting the coil to be fully effective during the other alternation, and means for varying the duration of the ineffective period.

2. In combination, a source of alternating current, a load circuit connected to said source, an impedance coil connected in series with said load circuit, means effectively short-circuiting said coil for a time during only one alternation in each cycle of said source while permitting the coil to be fully effective during the other alternation, and means for varying the duration of the short-circuit periods.

3. In combination, a source of alternating current, a load circuit connected to said source, an impedance coil connected in series with said load circuit, means for modifying the impedance of said coil comprising a single unidirectional conductive device connected in shunt to said coil, and means for varying the effective conductivity of said device, said single device comprising the sole means for modifying the impedance of said coil.

4. In combination, a source of alternating current, a load circuit connected to said source, an impedance coil connected in series with said load circuit, means for modifying the impedance of said coil comprising a single unidirectional arc-discharge device connected in shunt to said coil, and means for varying the period of conductivity of said device, said single device comprising the sole means for modifying the impedance of said coil.

5. In combination, a source of alternating current, a load circuit connected to said source, a transformer having a primary winding connected in said circuit in series with the load, means for modifying the impedance of said coil comprising a single unidirectional arc discharge device connected across the secondary winding of said transformer, and means for varying the period of conductivity of said device, said single device comprising the sole means for modifying the impedance of said coil.

6. A system for variably controlling the amount of power supplied to a load comprising, in combination, a load, a source of alternating current for said load, means for coupling said source to said load including a step-up transformer having a primary winding connected in said load circuit, a gaseous discharge device of lower current capacity than said load included in a circuit with the secondary winding of said transformer, said discharge device being supplied with space current from said secondary winding, and means for variably controlling the current flow through said gaseous discharge device.

7. A system for variably controlling the amount of power supplied to a load comprising, in combination, a load, a source of alternating current for said load, means for coupling said source to said load including a step-up transformer having a primary winding connected in series circuit relation with said load and said source of alternating current, a gaseous discharge device of lower current capacity than said load connected across the secondary winding of said transformer, said discharge device being supplied with space current from said secondary winding, and means for variably controlling the current flow through said gaseous discharge device.

8. A system for variably controlling the amount of power supplied to a load comprising, in combination, a load, a source of alternating current for said load, means for coupling said source to said load including a step-up transformer having a primary winding connected in said load circuit, an arc discharge device of lower current capacity than said load connected in circuit with the secondary winding of said transformer, said discharge device being supplied with space current from said secondary winding, and means for variably controlling the time of starting of the arc with respect to the cycle of said alternating current.

9. A system for variably controlling the amount of power supplied to a load comprising in combination a load, a source of alternating current for said load, means for coupling said source to said load including a step-up transformer having a primary winding connected in series circuit relation with said load and said source, an arc discharge device having a cathode, an anode and a control electrode, said discharge device having lower current capacity than said load and having its space current path connected across the secondary winding of said step-up transformer, means for impressing upon said control electrode an alternating voltage having a lagging phase displacement with respect to said anode voltage of the order of 135 degrees, and means for varying the amplitude of said alternating control voltage.

10. The method of controlling the flow of current to a load in an alternating current circuit having an impedance coil connected in series with the load which consists in effectively short-circuiting said coil for a time during one alternation in each cycle of the alternating current while permitting the coil to be fully effective during the other alternation, and varying the duration of the short-circuit periods.

11. In combination, a source of alternating current, a load circuit connected to said source, an iron-cored impedance coil connected in series with said load circuit, means for modifying the impedance of said coil comprising a single unidirectional conductive device connected in shunt to said coil, and means for varying the effective conductivity of said device, said single device comprising the sole means for modifying the impedance of said coil.

12. In combination, a source of alternating current, a load circuit connected to said source, an iron-cored impedance coil connected in series with said load circuit, means for modifying the impedance of said coil comprising a single uni-directional arc-discharge device connected in shunt to said coil, and means for varying the period of conductivity of said device, said single device comprising the sole means for modifying the impedance of said coil.

PALMER HUNT CRAIG.